United States Patent [19]

Jones et al.

[11] Patent Number: 5,775,512
[45] Date of Patent: Jul. 7, 1998

[54] COMPOSITE PACKAGE STRUCTURE FOR CONTAINING ARTICLES AND METHOD FOR PRODUCING THEREOF

[75] Inventors: Brad Allen Jones, Chesterfield; Ralph Scott Peterson, Clifton Forge, both of Va.

[73] Assignee: Westvaco Corporation, New York, N.Y.

[21] Appl. No.: 741,054

[22] Filed: Oct. 30, 1996

Related U.S. Application Data

[63] Continuation-in-part of Ser. No. 401,143, Mar. 8, 1995, abandoned.

[51] Int. Cl.$^6$ .................................................. B65D 77/00
[52] U.S. Cl. .................. 206/312; 206/387.13; 206/472
[58] Field of Search .............................. 206/312–313, 206/311, 387.13, 472, 524.1, 524.3

[56] References Cited

U.S. PATENT DOCUMENTS

| | | |
|---|---|---|
| 3,255,880 | 6/1966 | Grossman . |
| 3,463,307 | 8/1969 | Caplan . |
| 3,659,706 | 5/1972 | Serrell . |
| 4,635,797 | 1/1987 | Bankier . |
| 4,718,550 | 1/1988 | Johnson ................. 206/387.13 |
| 4,724,957 | 2/1988 | Burgschweiger . |
| 4,771,886 | 9/1988 | Johnson . |
| 4,778,051 | 10/1988 | Schaub et al. ............. 206/387.13 |
| 4,784,264 | 11/1988 | Sykes . |
| 4,793,477 | 12/1988 | Manning et al. . |
| 4,966,283 | 10/1990 | Sykes et al. . |
| 4,977,483 | 12/1990 | Perretta . |
| 5,121,834 | 6/1992 | Tissembaum . |
| 5,145,068 | 9/1992 | Schmitz et al. . |
| 5,284,242 | 2/1994 | Roth et al. ................. 206/472 |
| 5,351,823 | 10/1994 | Kollinek . |
| 5,353,932 | 10/1994 | Kollinek . |
| 5,544,748 | 8/1996 | Kollinek . |

*Primary Examiner*—Jacob K. Ackun
*Attorney, Agent, or Firm*—J. R. McDaniel; R. L. Schmalz

[57] ABSTRACT

This invention relates to paperboard and plastic composite package structures that combine an intricate thermoformed shell with a paperboard base or cover. Such structures of this type, generally, provide a lightweight package with a good printing surface on the outside of the package.

6 Claims, 2 Drawing Sheets

COMPOSITE PACKAGE STRUCTURE FOR CONTAINING ARTICLES AND METHOD FOR PRODUCING THEREOF

CROSS-REFERENCE TO RELATED APPLICATION

This application is a continuation-in-part of the commonly assigned, U. S. patent application Ser. No. 08/401, 143, filed Mar. 8, 1995, entitled COMPOSITE PACKAGE STRUCTURE FOR CONTAINING ARTICLES AND METHOD FOR PRODUCING THEREOF, now abandoned.

BACKGROUND OF THE INVENTION

1. Field of the Invention

This invention relates to paperboard and plastic composite package structures that combine an intricate thermoformed shell with a paperboard base or cover. Such structures of this type, generally, provide a lightweight package with a good printing surface on the outside of the package.

2. Description of the Related Art

It is known, in composite package structures, to make use of a book-like container paperboard cover and a plastic inner tray. Exemplary of such structures is U.S. Pat. No. 4,724,957 ('957), to O. Burgschweiger, entitled "Container." While the '957 patent teaches a paperboard cover and a plastic inner tray, the cover is not connected to the inner tray along the spine. Also, foil is located on the exterior side of the cover. It is apparent, that if the inner tray were bonded to the paperboard cover along the length of the spine, greater package rigidity would result. Also, if the foil cover were eliminated, a wider range of printed graphics could be used. Consequently, a more advantageous container, then, would be presented if the rigidity and range of printed graphics were increased.

It is also known, in composite packages, to make use of an inner molded tray and an outer cover. Exemplary of such prior art is U.S. Pat. No. 4,635,797 ('797) to J. D. Bankier, entitled "Pilfer Resistant Software Package". While the '797 patent teaches the use of a composite paperboard and plastic package, the plastic inner tray is welded to the paperboard cover by conventional RF techniques along the peripheral flange. The use of the high temperature RF techniques may cause temperature deformation of the thermoformable inner tray. Consequently, a still further advantageous composite package, then, would be presented if a low temperature, heat sealable coating were used.

Finally, it is known, in composite package structures, to make use of a plastic case suitable for housing objects. Exemplary of such prior art is U.S. Pat. No. 5,353,932 ('932) to K. Kollinek, entitled "Video Case and Method of Manufacturing." While the '932 reference teaches the use of a thermoformed plastic inner liner, a cardboard stiffener, an outer vinyl cover, a paper sleeve, and an outer clear plastic cover, the stiffener is not heat sealable which requires the extra outer covers and the added production expense. Also, the method of manufacture as disclosed in the '932 reference requires many production passes, i.e., a transportation of the intermediate product from one machine to another until the complete video case is constructed. Finally, because the various components of the '932 reference are individually cut and then added together to construct the final product, differences in thermal expansion between the dissimilar materials may cause an uneven and unattractive alignment between various components. Therefore, an even further advantageous composite package, then, would be presented if a heat-sealable paperboard could be used in conjunction with fewer and more efficient production steps.

It is apparent from the above that there exists a need in the art for a composite package which is rigid and is capable of employing a wide range of printed graphics and which at the same time avoids the use of high temperatures, but which employs a sealable paperboard and in conjunction with fewer and more efficient production steps. It is a purpose of this invention to fulfill this and other needs in the art in a manner more apparent to the skilled artisan once given the following disclosure.

SUMMARY OF THE INVENTION

Generally speaking, this invention fulfills these needs by providing a composite package for containing articles, comprising a paperboard base having first and second sides, a layer of particulate minerals located exterior to the first side of the paperboard base, a layer of a low temperature, heat sealable polymeric material located exterior to the second side of the paperboard base wherein the polymeric material is further comprised of a water-based ethylene vinyl acetate, a printed graphics located exterior to the layer of particulate minerals, a layer of varnish located exterior to the layer of printed graphics, and a thermoformable polymeric shell having first and second sides such that the first side of the shell is rigidly attached to the heat sealable polymeric material and the second side includes a plurality of article holding means and a flexible spine means located substantially between the plurality of the article holding means such that the plurality of articles holding means provide a means for holding an article when the article holding means are closed and the spine means provides support for the composite package and an alignment means for the article holding means.

In certain preferred embodiments, the particulate minerals are clay. Also, the thermoformable shell is constructed of polyvinyl chloride or a similar plastic material. Finally, the varnish is an electron-beam curable varnish.

In another further preferred embodiment, the composite package structure provides a lightweight package with a good printing surface on the outside of the package.

The preferred composite package, according to this invention, offers the following advantages: lightness in weight; use of a wider range of printed graphics; increased rigidity; lower manufacturing temperatures; good stability; good durability; increased scuff resistance; increased moisture resistance; and good economy. In fact, in many of the preferred embodiments, these factors of lightness in weight, a wider range of graphics, increased rigidity, and lower temperatures are optimized to the extent that is considerably higher than heretofore achieved in prior, known composite packages.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
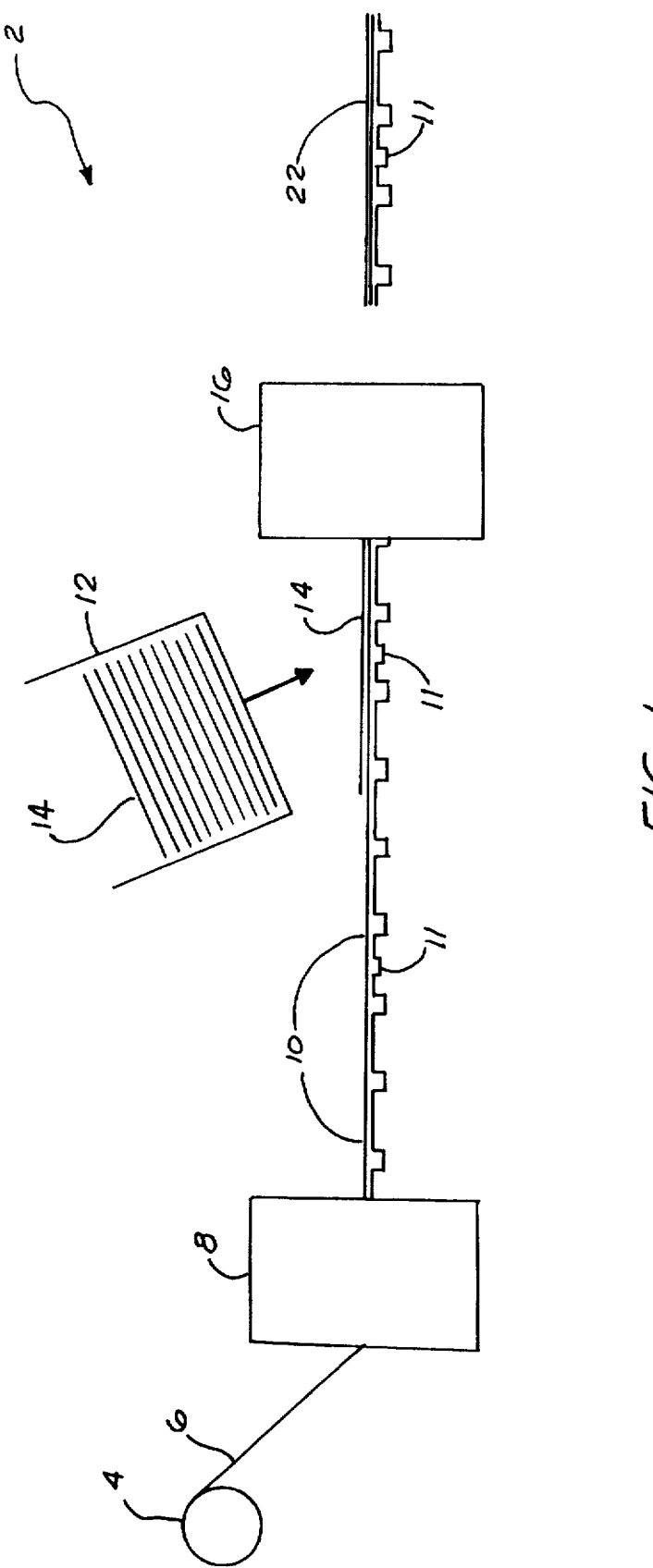
FIG. 1 is a schematic illustration of a method for producing a composite package, according to the present invention.

With reference first to FIG. 1, there is illustrated a, system 2 for manufacturing a composite package 22. In particular, system 2 includes in part, thermoformable polymer roll 4, thermoformable polymer sheet 6, conventional thermoformer 8, thermoformed polymer trays 10, flexible spine 11, conventional magazine 12, paperboard covers 14, heat sealer/trimmer 16, and composite packages 22. Thermoformable polymer roll 4 and sheet 6, preferably, are constructed of polyvinyl chloride (PVC), polystyrene, polyethylene terephthalate (PET) or any plastic material which can be thermoformed to create an inner tray shaped to match the product of interest.

Figure 3:
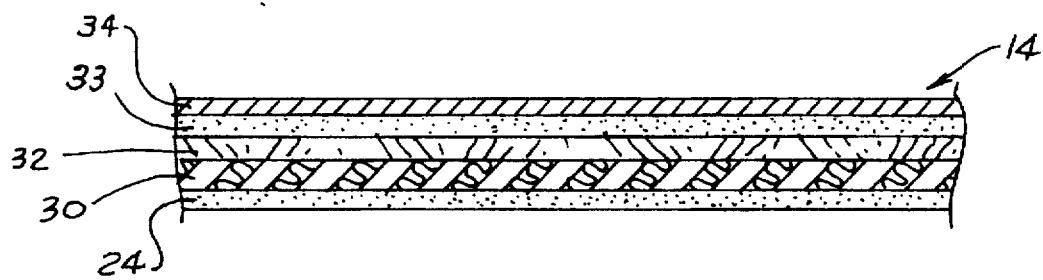
FIG. 3 is a cross-sectional view of a composite cover, according to the present invention.

As more clearly shown in FIG. 3, paperboard covers 14, preferably, include a paperboard base 30, a coating 32 of particulate minerals on one side, a layer 33 of printed graphics, a coating 34 of a conventional, electron-beam curable varnish and a coating 24 of a low temperature, heat sealable polymeric material on the other side. The particulate minerals, preferably, are clay. The low temperature, heat sealable polymeric material, preferably, is a water-based ethylene vinyl acetate (EVA) produced by Pierce & Stevens, Inc. of Buffalo, N.Y. under the tradename Latiseale®. The polymeric material is applied at a coat weight of 3–9 pounds/3000 ft.$^2$. Preferably, the coat weight is 6 pounds/3000 ft. It is to be understood that coating 34 can be applied to cover 14 by a conventional in line process in combination with printing and electron-beam curing of the printing. It is to be understood that coating 24 and layer 33 can be applied to cover 14 by conventional techniques.

Figure 2:
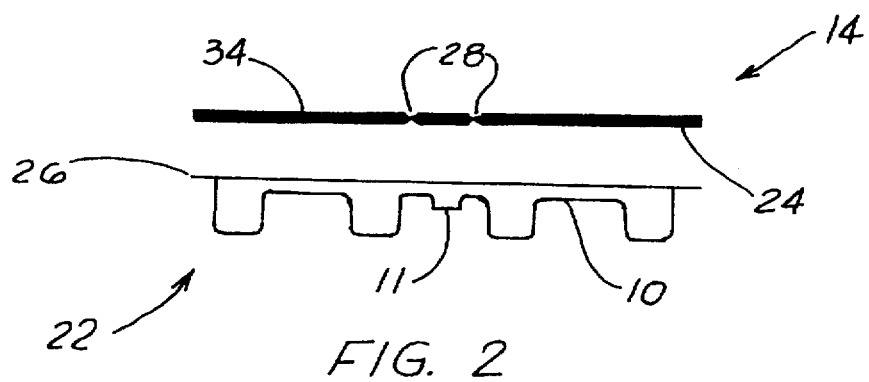
FIG. 2 is a side, exploded view the composite package, according to the present invention.

During the construction of composite packages 22, roll 4 is unrolled such that sheet 6 is formed. Sheet 6 is transferred through thermoformer 8 such that a web of trays 10 having flexible spine 11 is produced. After the web of trays 10 is produced, a paperboard cover 14 is placed upon one side of trays 10 such that coating 24 (FIG. 2) is adjacent to tray 10. Cover 14, preferably, has been printed with graphics layer 33 and coated with the varnish and cured with a conventional electron beam, such that as the electric beam contacts coating 34 a cross-linking between the various components in coating 34 is achieved which improves moisture resistance and scuff resistance and durability of coating 34.

After the paperboard cover 14 is placed upon tray 10, tray 10 and cover 14 are heat sealed and trimmed in heat sealer/trimmer 16 such that composite packages 22 are produced. It is to be understood that heat sealer 16 employs a conventional platen heat sealer which contacts coating 34 such that an adhesion between the various components in coating 24 and tray 10 is achieved.

It is also to be understood that the construction of composite package 22 is achieved in one-pass, i.e., package 22 is not transferred from one production line to another in order to construct package 22. Also, due to the set-up of the construction of package 22, cover 14 and tray 10 are heat sealed and then trimmed, although in a relatively short time period. In this manner, any differences in the coefficient of thermal expansion between the dissimilar elements and their possible resulting misalignment should be taken care of by the subsequent trimming. Thus, the heat sealing and subsequent trimming creates a clean and matched edge which should be resistant to any bending or fraying which is commonly referred to as "dog-earring".

FIG. 3 illustrates, in more detail, the final construction of composite package 22. In particular, composite package 22 includes, in part, thermoformed polymer tray 10, flexible spine 11, paperboard cover 14, low temperature, heat sealable coating 24, flange 26, score lines 28, paperboard base 30, particulate coating 32, printed graphics layer 33 and varnish layer 34. Coating 24, preferably, is the same low temperature, heat sealable coating 24, as described above. Also, coatings 32, 33 and 34 are the same coatings 32, 33 and 34 as described above. Also, score lines 283 are placed on paperboard cover 14 in order to provide a desired flexibility within paperboard cover 14. It is to understood, however, that score lines 28 may be omitted in certain instances.

Figure 4:
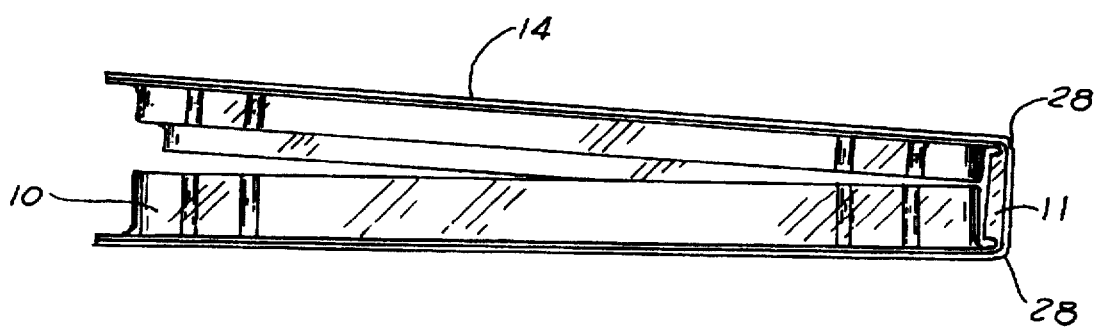
FIG. 4 is a side view of the constructed composite package of FIG. 2 and folded, according to the present invention.

In order to secure articles within package 22, package 22 is oriented such that the articles are placed in one section of tray 10 as shown in FIG. 4. The other section of tray 10 is then folded over in a book-like manner, along score lines 28 and coupled with the section of tray 10 holding the articles. In this manner, the articles are retained within tray 10 and package 22. Finally, flexible spine 11 is employed to add structural rigidity to package 22 and provide an alignment means so that the separate sections of tray 10, which are used to hold articles, can be properly aligned.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A composite package for containing articles, wherein said composite package is comprised of:

a paperboard base having first and second sides;

a layer of particulate minerals located exterior to said first side of said paperboard base;

a layer of a low temperature, heat sealable polymeric material located exterior to said second side of said paperboard base wherein said polymeric material is further comprised of water-based ethylene vinyl acetate;

a layer of printed graphics located exterior to said layer of said particulate minerals;

a layer of a varnish located exterior to said layer of said printed graphics; and a thermoformable polymeric shell having first and second sides said first side of said shell is rigidly attached to said heat sealable polymeric material and said second side includes a plurality of article holding means and a flexible spine means located substantially between said plurality of said article holding means such that said plurality of article holding means provide a means for holding an article when said article holding means are closed and said spine means provides support for said composite package and an alignment means for said article holding means.

2. The composite package, as in claim 1, wherein said layer of particulate minerals is further comprised of: clay.

3. The composite package, as in claim 1, wherein said varnish layer is substantially moisture resistant.

4. The composite package, as in claim 1, wherein said varnish layer is substantially scuff resistant.

5. The composite package, as in claim 1, wherein said varnish layer has increased durability.

6. The composite package, as in claim 1, wherein said package is further comprised of:

a flange means.

* * * * *

UNITED STATES PATENT AND TRADEMARK OFFICE
CERTIFICATE OF CORRECTION

PATENT NO. : 5,775,512
DATED : Jul. 7, 1998
INVENTOR(S) : Brad Allen Jones
Ralph Scott Peterson It is certified that error appears in the above-indentified patent and that said Letters Patent is hereby corrected as shown below:

Column 1, line 2 delete "AND METHOD"

In The Title: delete "AND METHOD". Column 4, line 25, change "Latiseale" to --Latiseal--. Column 4, line 6, change "283" to --28--.

Signed and Sealed this

Twenty-second Day of September, 1998

Attest:

BRUCE LEHMAN

Attesting Officer

Commissioner of Patents and Trademarks